(12) United States Patent
Seiwald

(10) Patent No.: US 11,844,169 B2
(45) Date of Patent: Dec. 12, 2023

(54) ROTARY-INDUCTION HEAT GENERATOR WITH DIRECT CURRENT EXCITATION, EXTREMELY SMALL ELECTRICAL/KINETIC EFFICIENCY, AND EXTREMELY HIGH THERMAL COP

(71) Applicant: Andreas Seiwald, Bremen (DE)

(72) Inventor: Andreas Seiwald, Bremen (DE)

( * ) Notice: Subject to any disclaimer, the term of this patent is extended or adjusted under 35 U.S.C. 154(b) by 567 days.

(21) Appl. No.: 17/043,472

(22) PCT Filed: Apr. 4, 2019

(86) PCT No.: PCT/EP2019/058564
§ 371 (c)(1),
(2) Date: Sep. 29, 2020

(87) PCT Pub. No.: WO2019/193122
PCT Pub. Date: Oct. 10, 2019

(65) Prior Publication Data
US 2021/0120636 A1    Apr. 22, 2021

(30) Foreign Application Priority Data
Apr. 6, 2018 (DE) ..................... 10 2018 108 179.0

(51) Int. Cl.
*H05B 6/10* (2006.01)
*H05B 6/64* (2006.01)

(52) U.S. Cl.
CPC ............. *H05B 6/109* (2013.01); *H05B 6/108* (2013.01)

(58) Field of Classification Search
CPC ........ H05B 6/108; H05B 6/109; B21D 22/26; B21D 37/10; G06F 16/215;
(Continued)

(56) References Cited

U.S. PATENT DOCUMENTS

| 3,014,116 A | 12/1961 | MacArthur |
| 4,398,111 A | 8/1983 | Zuch |

(Continued)

FOREIGN PATENT DOCUMENTS

| DE | 2647741 A1 | 4/1977 |
| DE | 2620236 A1 | 11/1977 |

(Continued)

OTHER PUBLICATIONS

Japanese Office Action, as issued in connection with Japanese Application No. 2020-554872, dated Mar. 22, 2023, 8 pgs w/translation.

(Continued)

*Primary Examiner* — Quang T Van
(74) *Attorney, Agent, or Firm* — Maschoff Brennan

(57) ABSTRACT

A rotary-induction heat generator with direct current excitation for the heating of matter, an alternating magnetic field for the generation of inductive heat, is generated with a DC coil, a static magnetic field converted into an alternating magnetic field, wherein a DC coil is received by a magnetic ring (20), wherein the magnetic ring (20) is statically connected to the housing (17) of the rotary-induction heat generator (1), and wherein the static magnetic field (51) generated by the DC coil (29) is converted into an alternating magnetic field (52) by way of a a pole wheel (19), wherein the pole wheel (19) consists of an inner pole ring (53), an outer pole ring (54) and a pole ring carrier (21, 24), by which the static magnetic field (51) is converted into an alternating field (52) in an induction ring (18) axially adjacent to the pole wheel (32).

16 Claims, 11 Drawing Sheets

Figure 1:
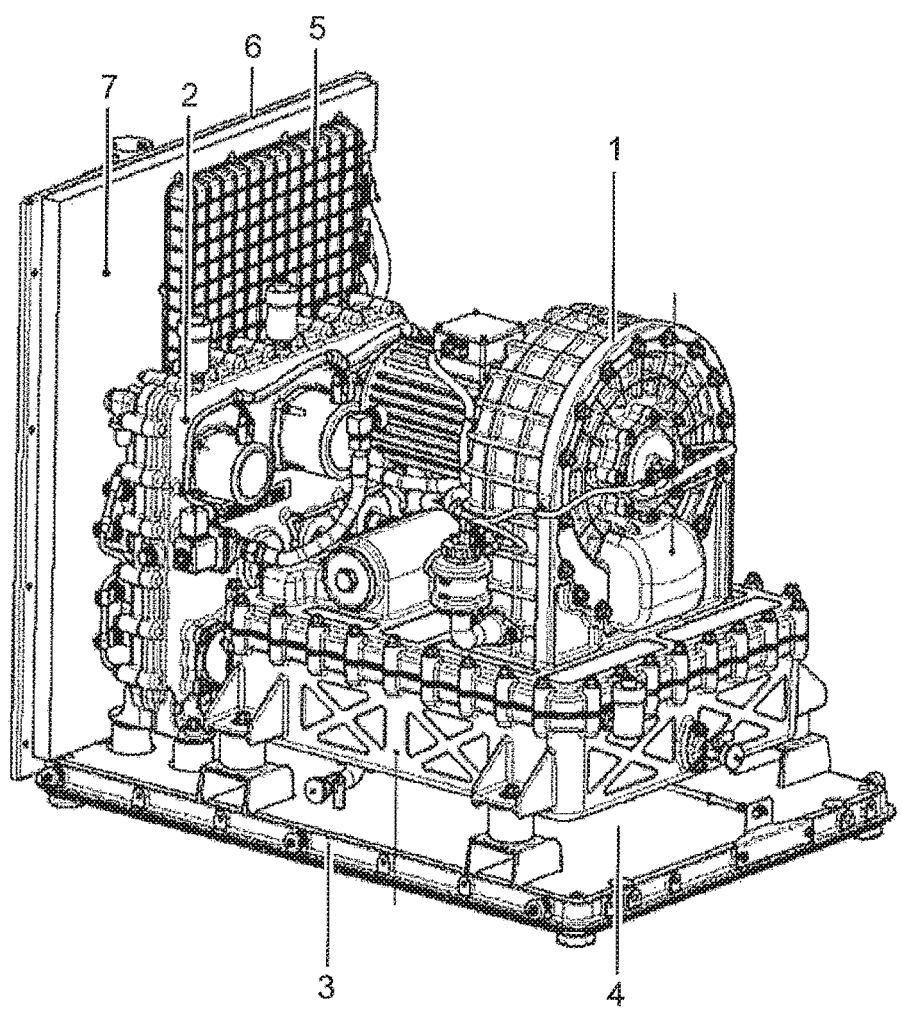

(58) Field of Classification Search
CPC .... G06F 16/2282; G06F 17/18; G06F 40/177; G06N 20/00; Y02B 40/00
USPC ....... 219/628, 631, 635, 637, 639, 640, 642, 219/643, 647, 648, 652, 653, 672
See application file for complete search history.

(56) References Cited

U.S. PATENT DOCUMENTS

| | | | |
|---|---|---|---|
| 4,423,344 | A | 12/1983 | Jones |
| 2006/0086729 | A1* | 4/2006 | Lunneborg ............. H05B 6/108 219/628 |
| 2014/0110938 | A1 | 4/2014 | Okazaki et al. |
| 2014/0231414 | A1 | 8/2014 | Nelson |

FOREIGN PATENT DOCUMENTS

| | | |
|---|---|---|
| DE | 3129817 A1 | 2/1983 |
| DE | 199 15 842 A1 | 12/1999 |
| DE | 10 2016 125 500 A1 | 6/2018 |
| EP | 0062706 | 10/1982 |
| EP | 0071046 | 2/1983 |
| FR | 2864369 A1 | 6/2005 |
| JP | 10-503617 A | 3/1998 |
| JP | 2000-219032 A | 8/2000 |
| JP | 2003-88090 A | 3/2003 |
| JP | 2009-510702 A | 3/2009 |
| JP | 2011-216325 A | 10/2011 |
| JP | 2012-2388 | 1/2012 |
| WO | 96/29845 | 9/1996 |
| WO | 02/087285 A1 | 10/2002 |
| WO | 2008/028673 A1 | 3/2008 |
| WO | 2011/125485 A1 | 10/2011 |

OTHER PUBLICATIONS

German Office Action, as issued in connection with German Application No. 10 2018 108 179.0, dated Mar. 26, 2019, 16 pgs w/translation.

* cited by examiner

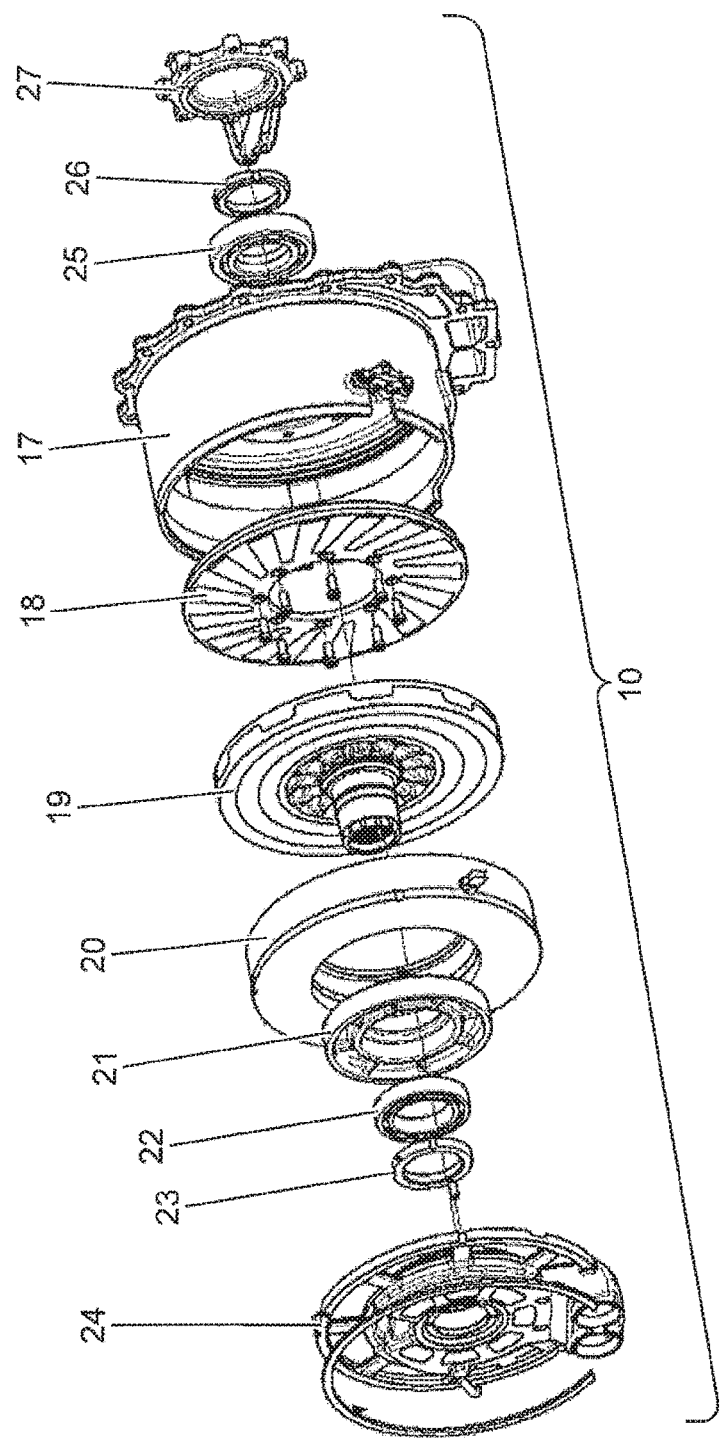

ROTARY-INDUCTION HEAT GENERATOR WITH DIRECT CURRENT EXCITATION, EXTREMELY SMALL ELECTRICAL/KINETIC EFFICIENCY, AND EXTREMELY HIGH THERMAL COP

CROSS-REFERENCE TO RELATED APPLICATIONS

This application is a national phase application of PCT/EP2019/058564, filed Jan. 24, 2019, filed Apr. 4, 2019 which claims the benefit of German Patent Application No. 10 2018 108 179.0 DE, filed Apr. 6, 2018, both of which are incorporated by reference herein in their entirety.

The invention relates to a rotary-induction heat generator, in which the thermal energy is generated by means of magnetic induction in the form of eddy currents by way of direct current excitation and a mechanical device for the generation of the alternating magnetic field. The heat generator can be used for the generation of hot water for all types of heating systems, as well as for domestic hot water heating and, by way of a separate device, for the efficient conversion of thermal into kinetic energy, and of thermal energy into cooling energy.

Eddy currents are short-circuit currents that convert the electrical energy in an electrical conductor into thermal energy. Apart from low convection losses, this energy is transferred 100% into a solid, liquid (preferably oil), or gaseous, heat transfer medium.

There are already heat generators of known art in which thermal energy is generated with eddy currents. Some of these are, for example, induction ovens, or induction hobs.

Here thermal energy is generated exclusively in the medium to be heated. The medium forms the magnetic, or electrical conductive, bridge to the heating unit, where, as a consequence of eddy currents, the medium heats up. In the heating unit itself, only minor hysteresis and eddy current losses are registered.

For the systems cited to be able to function, the excitation coils must be supplied with alternating current (that is to say, alternating voltage).

This alternating current generates an alternating magnetic field in the coils, wherein inductive currents are generated, which act counter to the applied current in accordance with the well-known law of induction.

For this purpose certain technical measures are necessary, such as magnetic cores made of thin, coated and insulated, steel sheets with poor electrical conductivity, or ferrite cores with a high electrical resistance to eddy currents, together with coils with a low number of turns and a low ohmic resistance to inductive reactance. The precise mode of operation of alternating current coils will not be discussed in any further detail here.

In addition to the heating systems already of known art, eddy current brakes should also be mentioned, which generate thermal energy in a similar manner. The same problem is evident here as well. Although eddy current brakes are operated with direct current and have a high level of electrical efficiency, they require an equivalent kinetic energy so as to generate the thermal energy, that is to say, so as to keep the system in motion.

This means that for all the systems cited, the electrical and/or kinetic energy to be introduced is greater than the thermal energy that can be utilised. These heating systems do not permit any energy savings, and are sometimes less suitable, or sometimes not at all suitable, for heat generation in the heating and domestic hot water sector.

Reference is made to WO 2011/125485 A1, US 2014/110938 A1, U.S. Pat. No. 3,014,116 A, DE 2620236 A1, DE 2647741 A1, FR 2864369 A1, WO 2008028673 A1, EP 0 0 071 046, US 2014/0231414, DE 31 29 817, U.S. Pat. No. 4,423,344 and EP-A2-0 062 706 as prior art.

Up to the present time, the systems of known art have not gained full acceptance because of their thermal efficiency values (COP), which are too low. Also, because of their disadvantageous structural build, the systems are only designed on a regular basis for relatively low power outputs, in particular for use in vehicles, for example as vehicle heating systems.

The COP factor, also known as the coefficient of performance (in German "Leistungszahl", abbreviated to LZ), and also known as the energy efficiency ratio (EEER)), indicates the ratio of thermal power generated to the electrical power used. A coefficient of performance of 4, for example, means that the heat output provided is 4 times the electrical power used. In other words, a heat pump with a COP factor of 4 provides 4 KW of heat output from 1 KW of electrical power supplied.

EP 0071046 A1 describes a liquid-cooled alternator, to which an additional component is coupled so as to heat the cooling water further, and this is used to heat the driver's cab. This heat generation component is a claw pole rotor with an integrated excitation coil, wherein the excitation current must be supplied, via slip rings, with a rotating coil. In addition, the stator is constructed using coated steel sheets for magnetic field transfer, and a solid material with good electrical conductivity is attached to the respective stator ends. This prior art also discloses that a continuous braking torque is generated, and that this is equivalent to the thermal energy generated. Finally, this prior art discloses that the coil, which generates a static field, is in constant rotation, and that the excitation current for the coil is supplied via wear-prone slip rings.

US 2014/0231414 discloses an eddy current brake, in which the magnetic field is generated by means of permanent magnets, and induction disks consist of a good electrical conductor. This prior art differs from conventional eddy current brakes in that the power is not controlled by rotating the pole packs; instead the pole packs are swiveled inwards or outwards relative to the induction disks by means of a swiveling device.

In the case of all of the systems cited, the energy introduced is generally greater than the useful energy obtained from the systems. Useful energy is understood to be when, for example, an ohmic resistance converts 100% of the electrical energy (current×voltage=E in W) into thermal energy. From this it can be seen that these heating systems do not permit any energy savings, and therefore such systems have so far been not very suitable, or not at all suitable, for heat generation in the heating and domestic hot water sector.

The object of the invention is to avoid the disadvantages of the heat generators cited, and to provide a substantially improved heat generation system.

Finally, the inventive rotary-induction heat generator should also make it possible to provide an output of more than 10 kW, preferably more than 20 or 50 kW, or even in excess of 100-500 kW.

The object is achieved, according to the invention, by means of a rotary-induction heat generator with the features according to claim 1; advantageous developments are described in the subsidiary claims, and also in the present description and figures.

The invention is based on the recognition that the alternating magnetic field required for purposes of induction is generated by way of an excitation coil, not by means of alternating current, but instead by means of direct current, wherein the excitation coil preferably does not rotate, but rather is statically fixed. Slip rings can therefore be omitted. Finally, the invention proposes an alternative structure for the configuration of the magnetic ring and a pole wheel, by means of which it is possible to achieve a desirable very high COP factor, which up to the present time has not been achieved by the rotary-induction heat generators of the prior art. Finally, the invention also aims to ensure that the rotary-induction heat generator has a deliberately very low electrical (excitation coil)/kinetic (drive motor) efficiency, by which is meant a value of less than 10%, preferably even less than 2%. At the same time, however, the inventive rotary-induction heat generator has a very high COP factor. The COP factor is usually referred to as a "coefficient of performance", and according to the invention this COP factor has a value of more than 2, preferably more than 5, for example, any preferred value from the range 6 to 50.

Here it is important not to make the mistake of equating efficiency with the COP. COP indicates the factor by which the input energy is better utilised. In the forms of application known from the prior art, the COP factor is regularly very small, that is to say, it lies below 2, regularly at 1 or less, because the energy supplied is only slightly higher than the energy discharged, in order to achieve a deliberately high efficiency. That is to say, the already high level of efficiency does not permit any further effective increase in utilisation.

The situation is different if, as in the present case with the invention, the efficiency is extremely low, and the eddy currents are not regarded as useful energy, but rather as waste energy. Here the energy discharged (energy out) is the kinetic component, because the magnetic process enables either the driving energy or the braking energy to be utilised. The energy supplied (energy in) is to be seen as the excitation power of the DC coil and the kinetic energy of the drive motor. The two together give a measure for the energy, which is opposed to the actual useful energy, in conversion either a positive and/or negative torque.

Eddy current brakes are designed in such a way that the eddy currents have a "three-axis" effect. With the invention it is now possible to decouple the action of the eddy currents such that these no longer act predominantly (>90%) along the rotational axis (Z-axis) and brake the pole wheel strongly, but rather are also directed, under certain circumstances predominantly, in fact, along the ineffective X- and Y-axes.

DC coils have an inductive reactance that is many times lower than that of alternating current coils. This allows for a low excitation current and many turns. As a result, the magnetic potential (vector potential) is equivalent to current×turns. A high excitation current and few turns (N), e.g. 100 A×1 N=100 AW (magnetomotive force), or a low excitation current and many turns, e.g. 1 A×100 N=100 AW, are the same magnitude. Because the static magnetic field does not generate any induction, the invention is also explained and described in the figures below.

Figure 2:
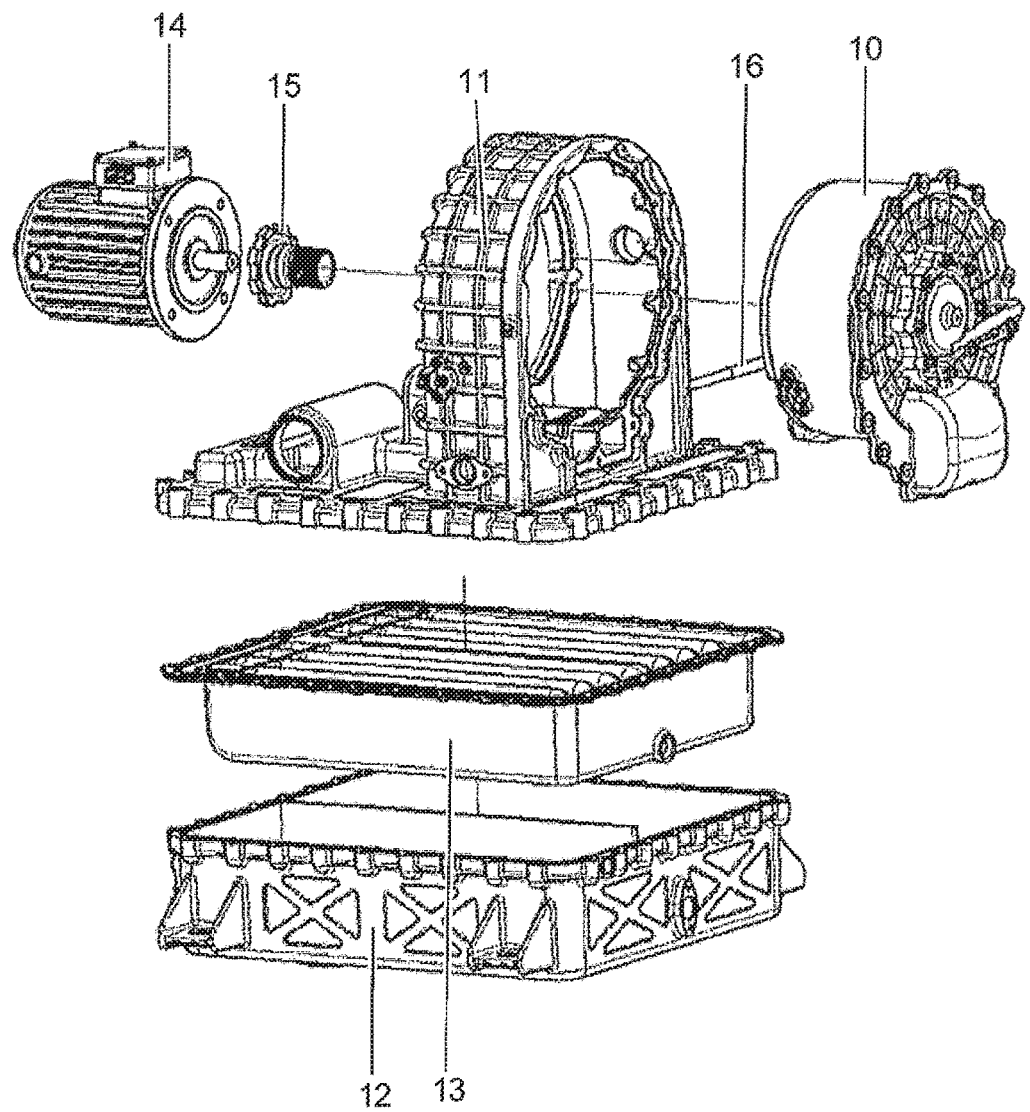
Figure 3B:
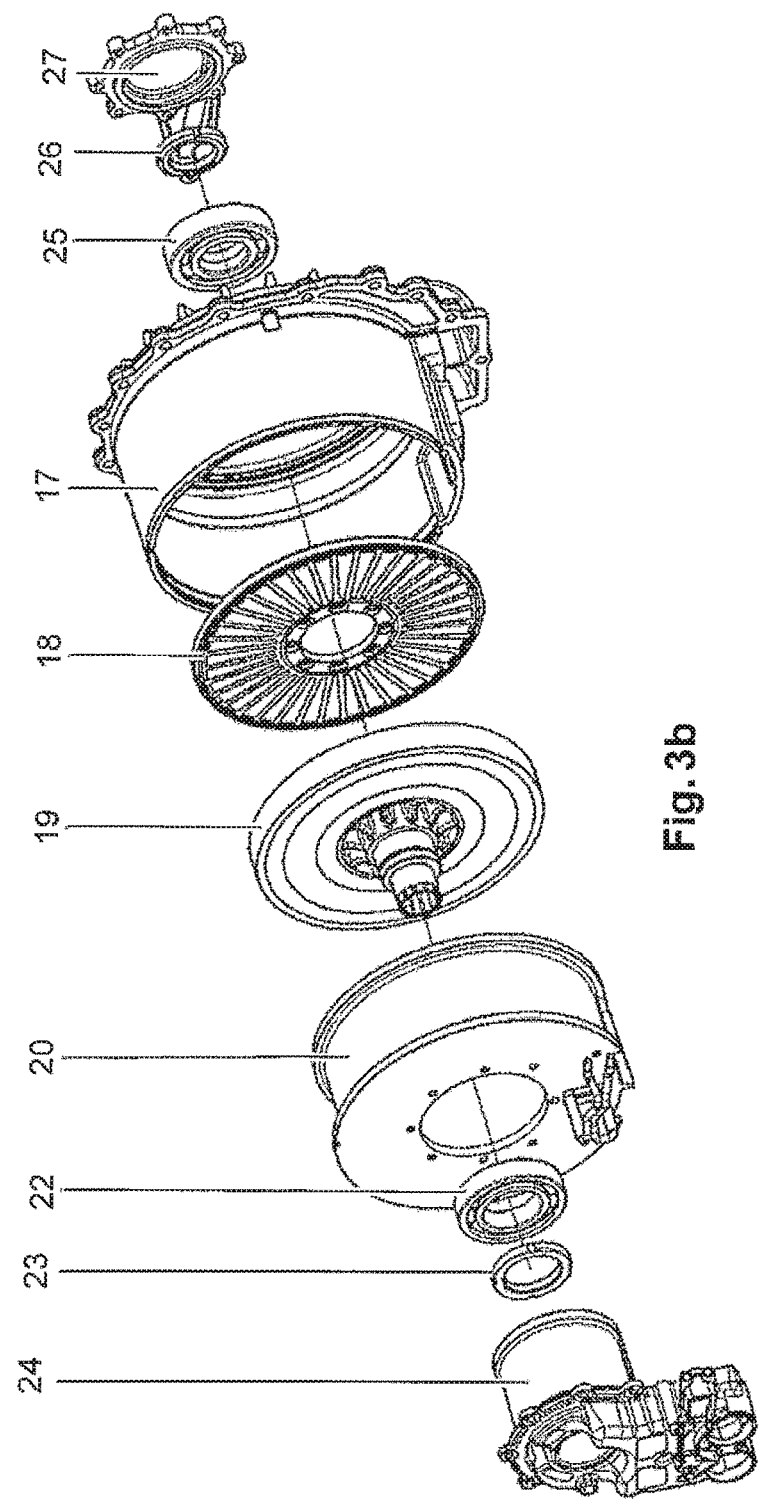
Figure 4A:
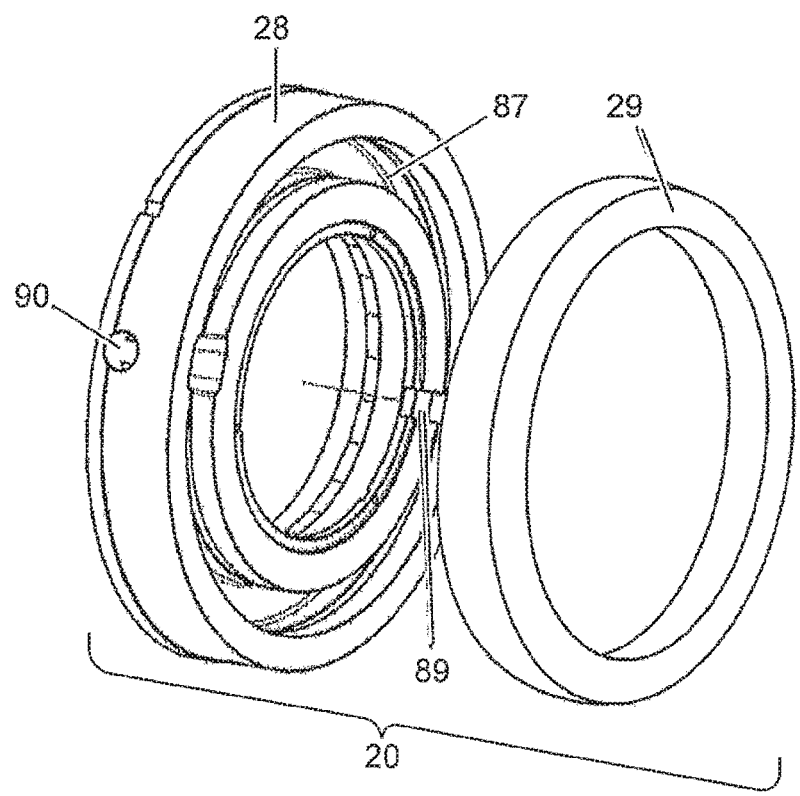
Figure 4B:
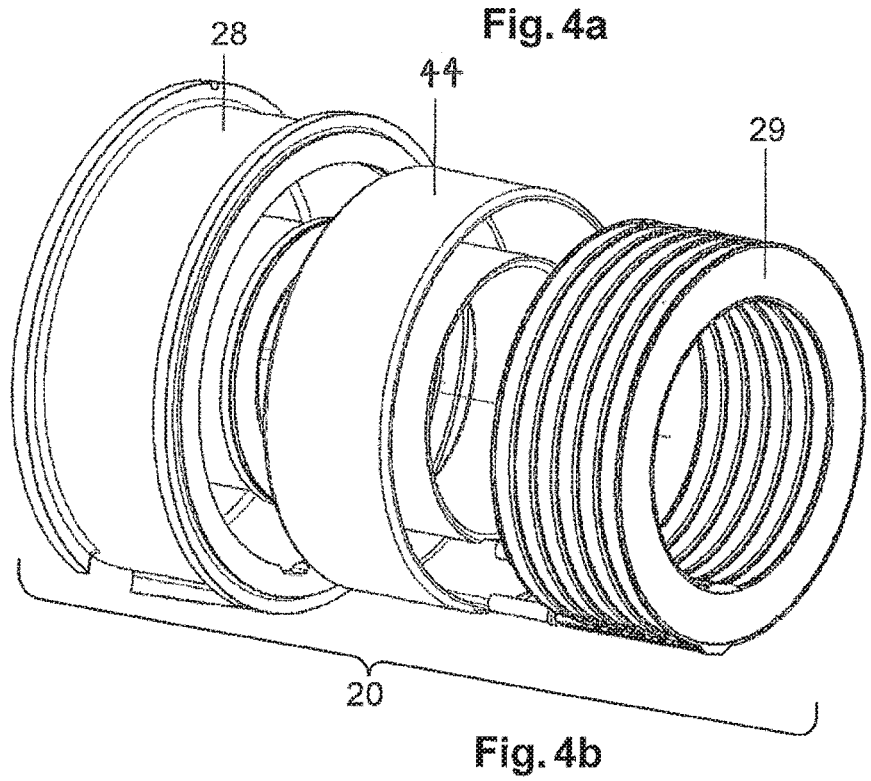
Figure 4C:
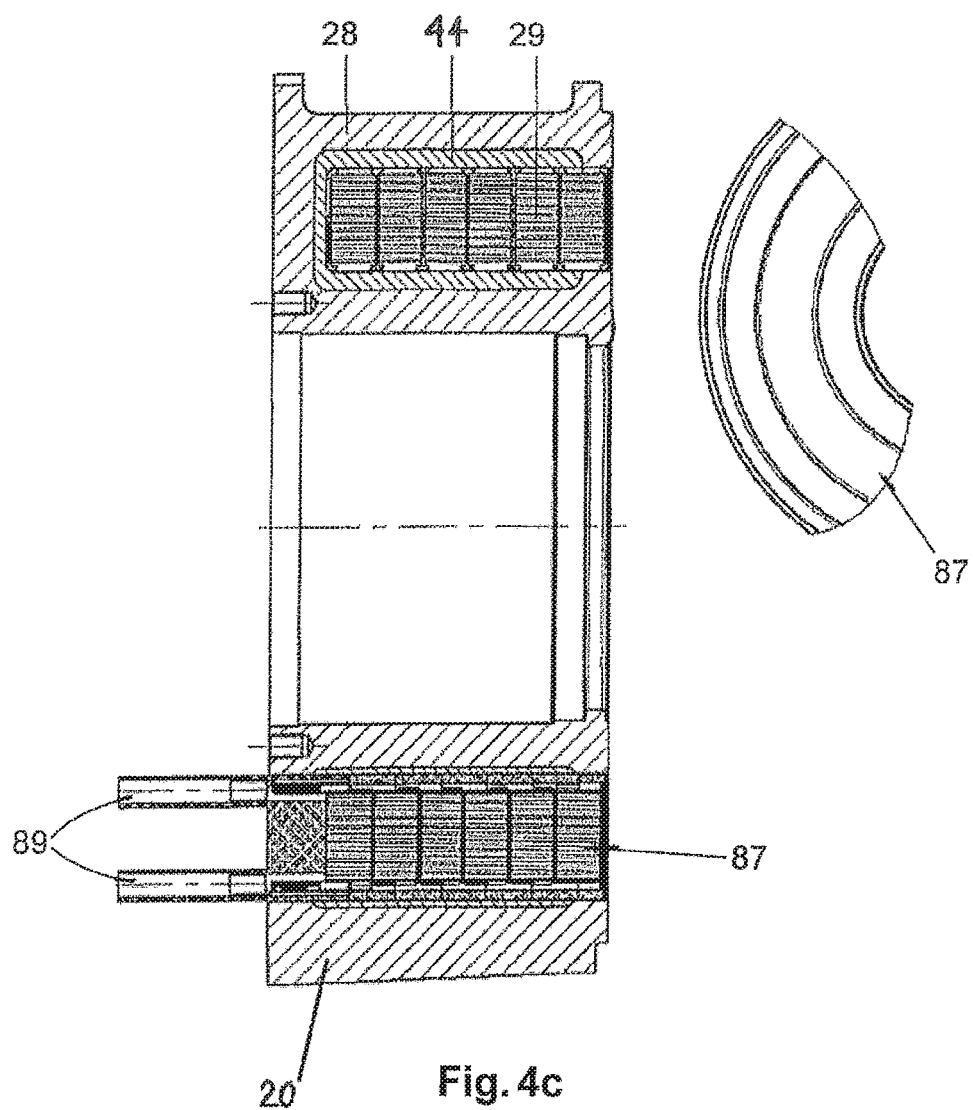
Figure 5A:
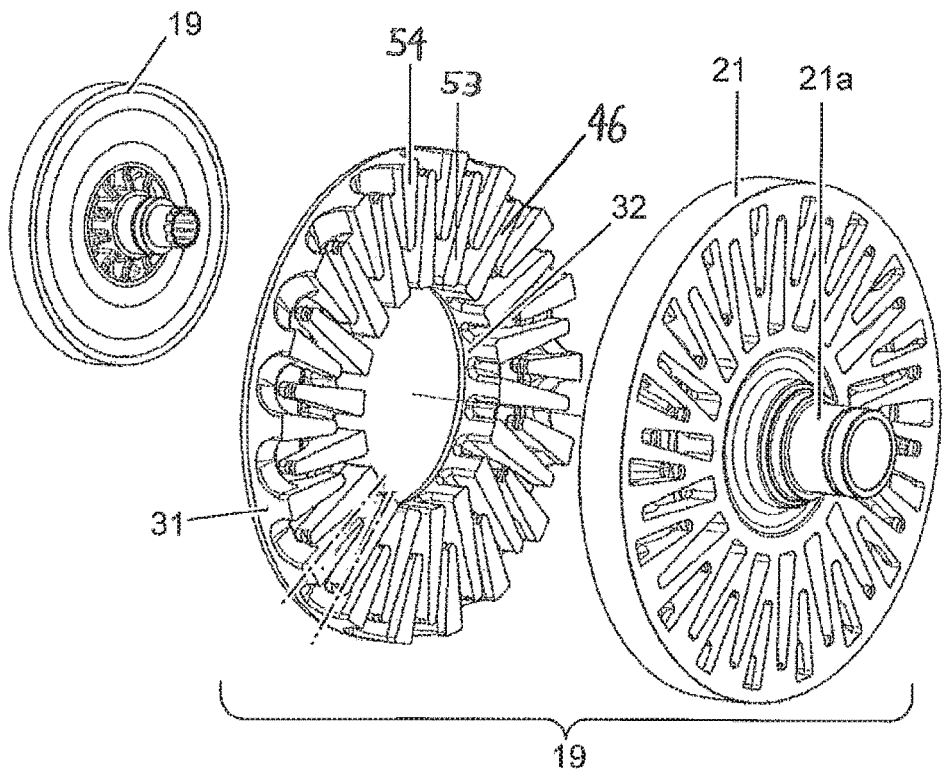
Figure 5B:
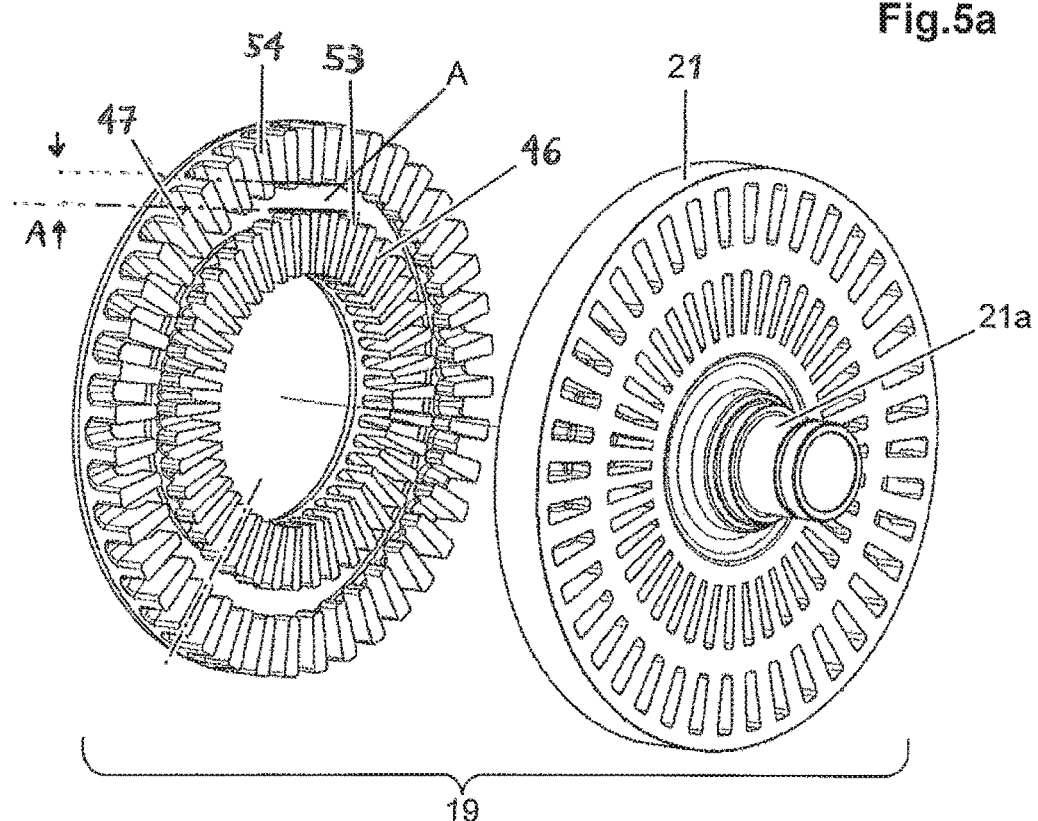
Figure 6A:
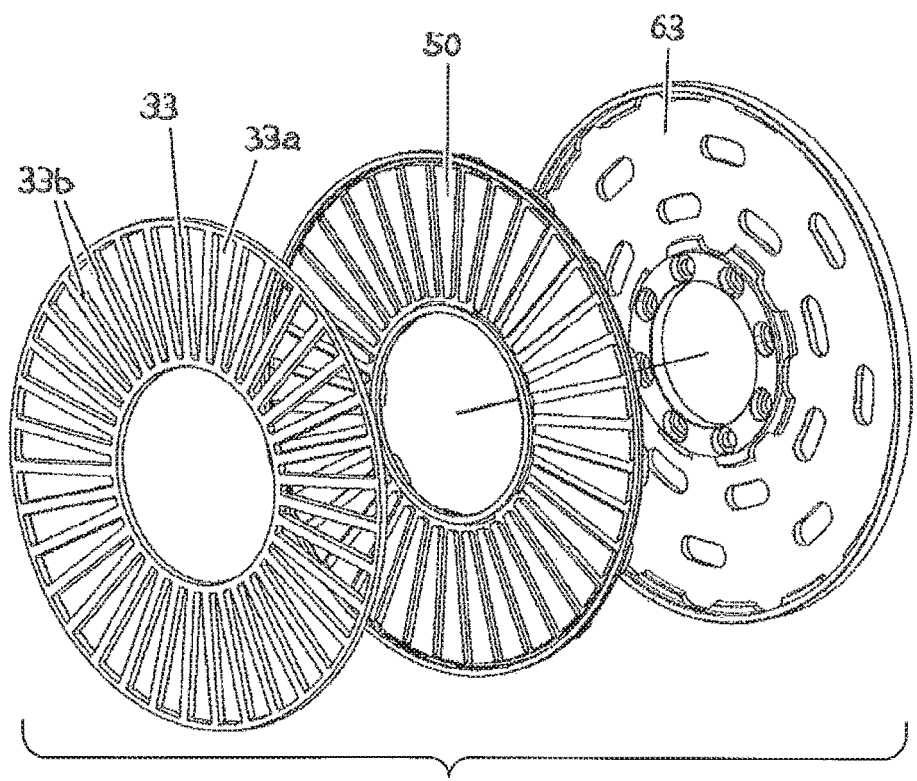
Figure 6B:
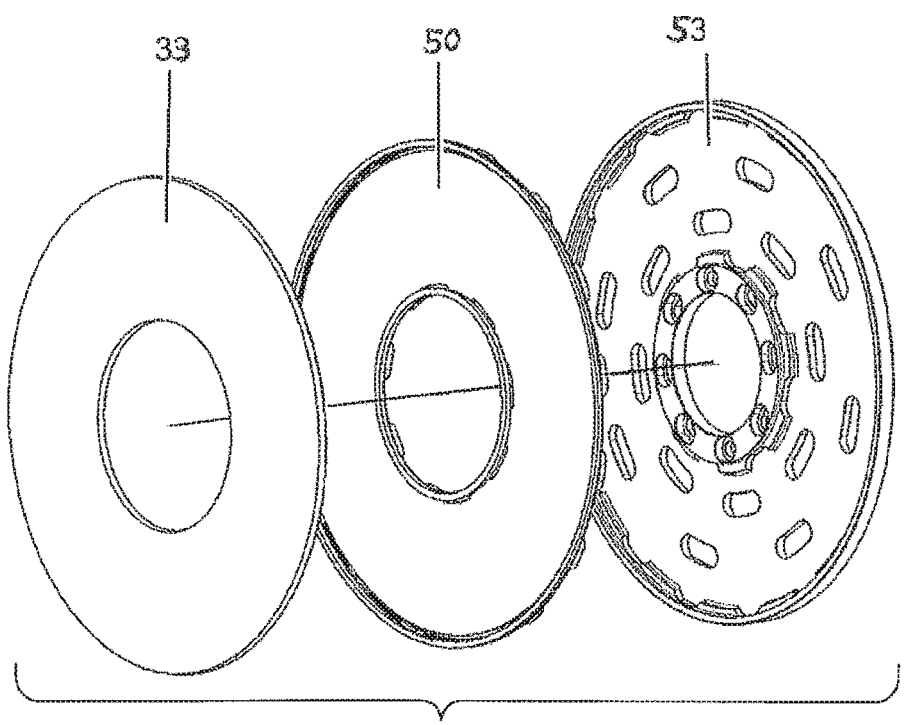
Figure 6C:
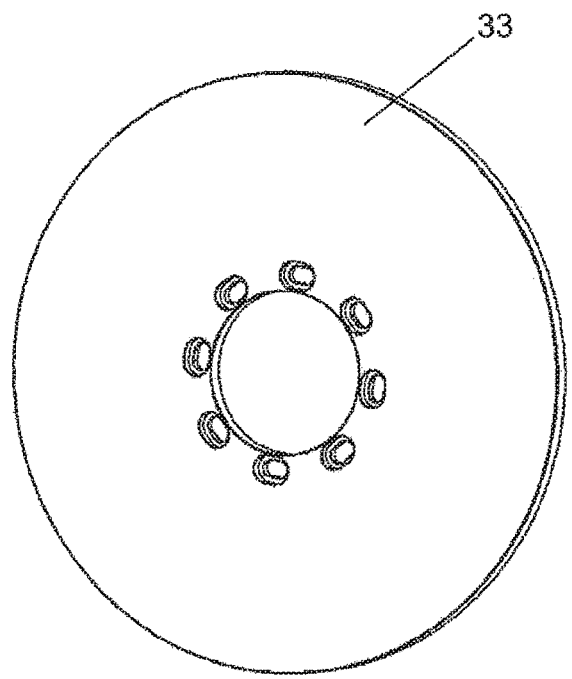
Figure 6D:
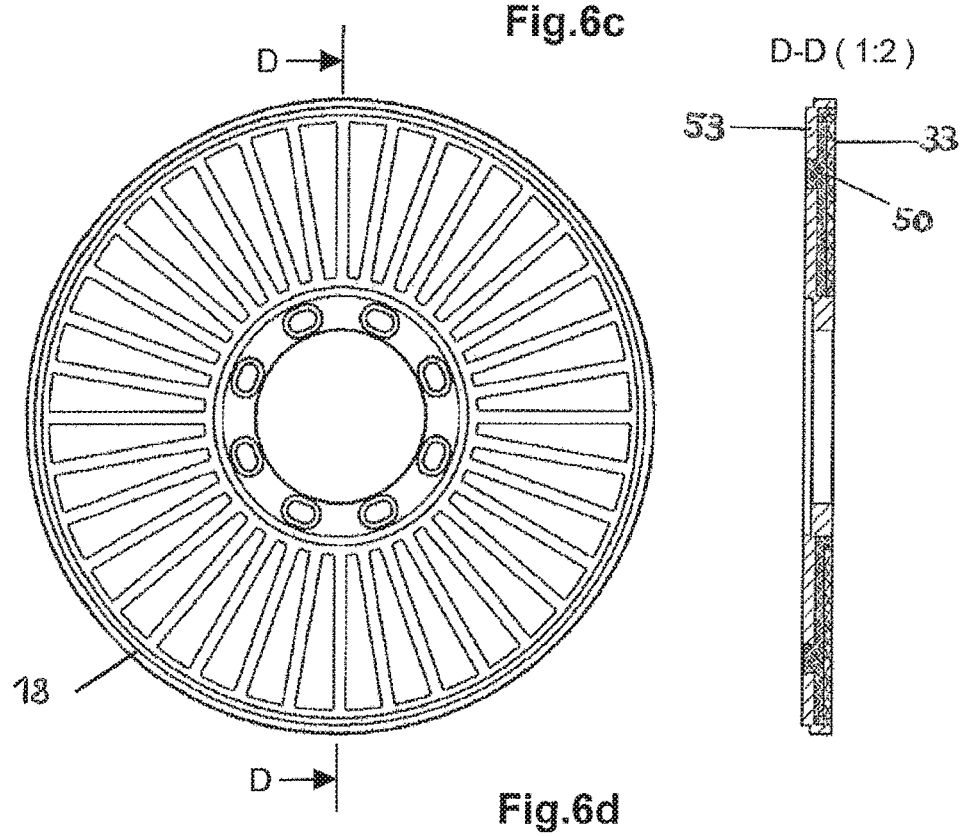
Figure 7:
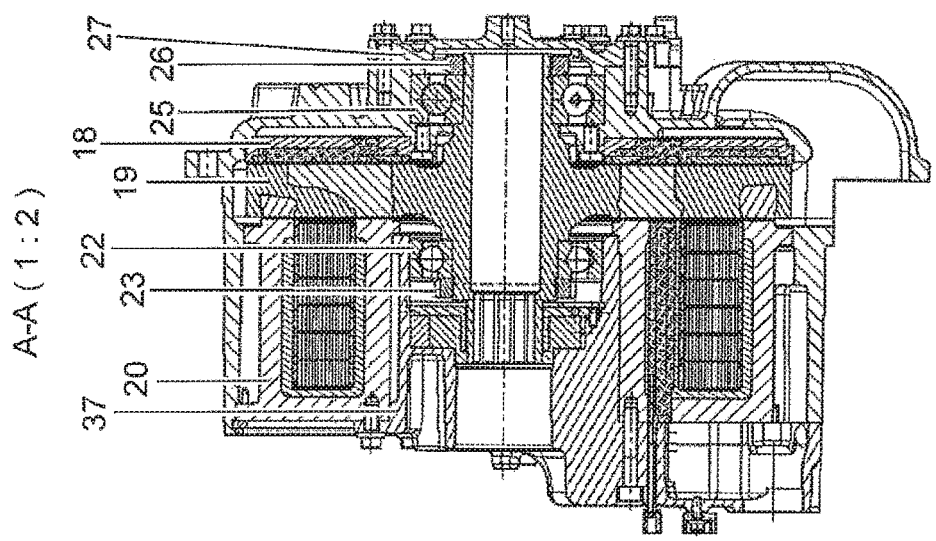
Figure 7:
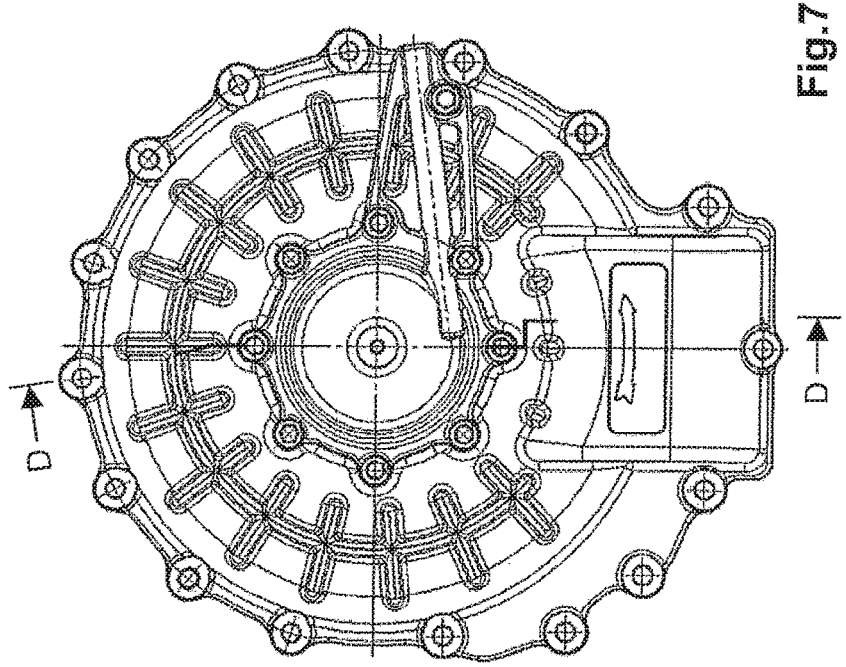
Figure 8:
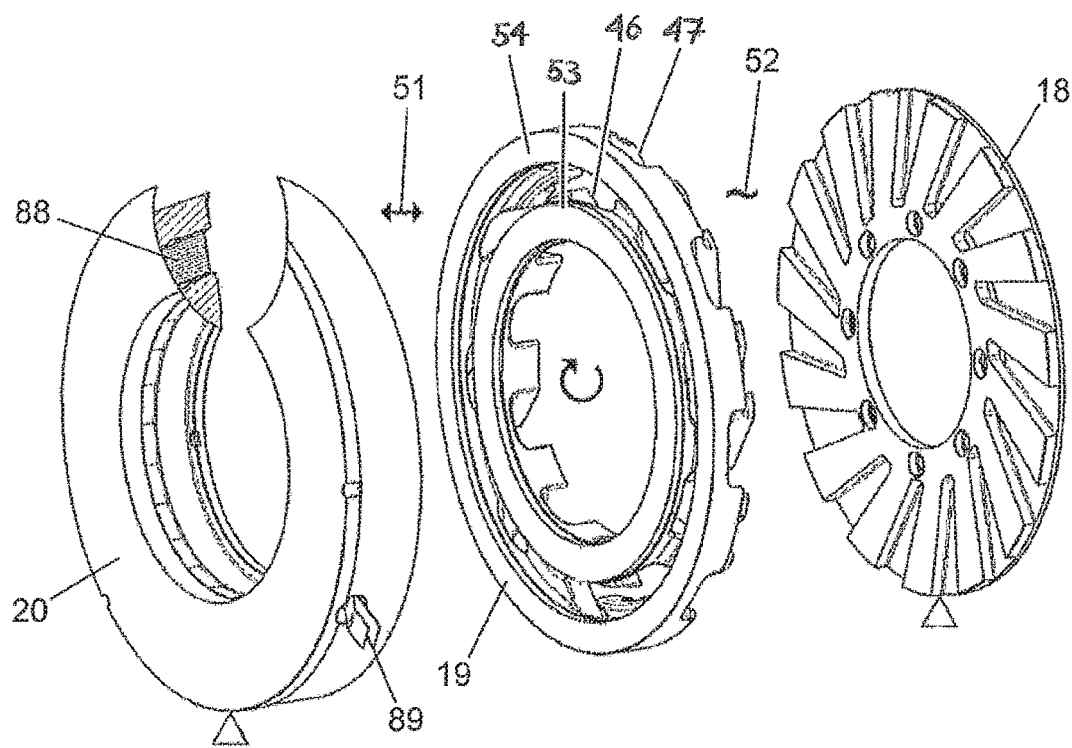

The figures show a possible example of embodiment of the invention. Here:

FIG. 1 shows a plan view onto an inventive rotary-induction heat generator,

FIG. 2 shows an exploded view of the essential parts of the inventive rotary-induction heat generator, FIGS. 3a, b show exploded views of the inventive heat generator, FIG. 4a shows an exploded view of the magnetic ring on the one side and the DC coil on the other, circuit ring, FIG. 4c shows a cross-section through the structure of the magnetic ring in FIG. 4b, FIG. 5a shows an exploded view of a pole wheel, consisting of an inner pole ring, an outer pole ring, and a pole ring carrier, FIG. 5b shows an exploded view of an alternative embodiment of the pole wheel, FIG. 6a shows an exploded view of an induction ring built up from a number of parts, FIG. 6b shows an exploded view of an alternative embodiment of the induction ring, FIG. 6c shows a side view of an induction ring, FIG. 6d shows a further side view of an induction ring, together with a view in cross-section, FIG. 7 shows a plan view onto an inventive rotary-induction heat generator, together with a view in cross-section through the latter, FIG. 8 shows an exploded view of the magnetic ring, pole wheel and induction ring, together with a representation of the magnetic fields between the components.

FIG. 1 shows the basic design of the inventive rotary-induction heat generator 1 and a heat exchanger connected to it, together with a mixing box 2 for hot/cold water provision. As can be seen in FIG. 1, all parts of the equipment are supported on a base frame 3. This base frame has a heat and sound insulation mat 4, and a heat and sound insulation hood can be fitted over the device shown in FIG. 1, wherein the hood has display and control elements, and the hood itself also has a removable or opening door. As can also be seen in FIG. 1, on its rear side the heat generator has a rear wall 6, which is also equipped with a heat and sound insulation mat on its rear face, and the unit also has control electronics 5.

FIG. 2 shows an exploded view of some parts of the inventive rotary-induction heat generator shown in FIG. 1. Here the figure shows a lower heat exchanger housing 12, an oil-water separator 13, an upper heat exchanger housing 11, a rotary-induction heat generator unit 10, a controller 16 for oil injection volume, a drive motor 14 in the form of a typical drive, and a coupling to connect the rotary-induction heat generator unit 10 and the drive motor 14.

FIG. 3a shows in the exploded view details of the rotary-induction heat generator unit 10, consisting of (from left to right) an oil pump 24, a support bearing 22, a support bearing clamping nut 23, a support bearing hub 21, and a magnetic ring 20 with a DC coil 29 (static), a pole wheel 19 (rotating), an induction ring 18 (static), a housing 17 of the rotary-induction heat generator unit 10, a guide bearing 25, and a guide bearing clamping nut 26, together with a front cover 27.

FIG. 3b shows in the exploded view details of the rotary-induction heat generator with direct current excitation, in a slightly different, but comparable, design to that shown in FIG. 3a.

The design and functionality of the magnetic ring 20, the pole wheel 19, and the induction ring 18 are explained below. In accordance with the invention, in FIG. 4a a DC coil 29 is received in a magnetic ring housing 28 of the magnetic ring 20. Here the DC coil is preferably fixedly connected to the magnetic ring housing, wherein the magnetic ring 20, together with its magnetic ring housing 28, is itself statically connected to the housing 17 of the rotary-induction heat generator 1, and the static magnetic field 51 generated by the DC coil 29 is converted into an alternating magnetic field 52 by way of a rotating mechanical component, specifically the pole wheel 19.

FIG. 4b shows an alternative form of embodiment to that in FIG. 4a, in which the DC coil 29 is received by a short-circuit ring 44, which in turn is arranged in the housing 28 of the magnetic ring 20.

The short-circuit ring 44 consists either of a material that has good electrical conductivity, or is magnetic, or of a material that has good electrical conductivity and is non-magnetic, for example, aluminium. The integral accommodation of the short-circuit ring 44 with the DC coil 29 in the magnetic ring 20 is designed to increase the manifestation of eddy currents in the magnetic ring, and thereby to increase the thermal efficiency value (COP). Here care must be taken to ensure that the short-circuit ring 44 has higher values than the magnetic ring housing in terms of electrical conductivity and/or magnetic permeability. As can be seen in FIGS. 4a and 4b, the magnetic ring housing 28 is formed by a ring with a U-shaped cross-section, and consists of a ferromagnetic material, preferably pure iron. By virtue of the U-shaped ring a groove 87 is formed in which—see FIG. 4a—the DC coil 29 is positioned, or in which—see FIG. 4b—the short-circuit ring 44 is positioned, together with the DC coil 29. For its part the DC coil 29 is also of an annular design.

The DC coil 29 has a wound coil, which, for example, can consist of a sheet steel strip, a round wire, or even a rectangular wire. By virtue of the static magnetic field, the magnetic ring 20 can consist of solid material, layered sheet steel, or sintered metal. The magnetic ring 20 has an inner and an outer uninterrupted planar surface, where the magnetic field alternately emerges, for example, as a south pole, and as an opposite pole, that is to say, a north pole, and enters structurally identical surfaces of the axially adjacent pole wheel 19.

Alternatively, it would also be conceivable to insert a permanent magnet into the magnetic ring for purposes of magnetisation, instead of the DC coil. Possible disadvantages of permanent magnets are high manufacturing costs, a low Curie temperature, and a complex control technology for setting the heat output. FIG. 4a also shows a power supply connection 89 for the DC coil 29. This power supply connection is led to the exterior through an opening 90 in the magnetic ring 20 so as to enable an external power connection for the DC coil.

FIG. 4c shows a cross-sectional presentation of the structure of the magnetic ring 20 in FIG. 4b, Here it can be seen that the magnetic ring 20 is designed as a U-shaped ring, which for its part receives the short-circuit ring 44 and, within the short-circuit ring 44, receives the DC coil 29. FIG. 4c also shows a detail of a side view of the magnetic ring 20 with the side parts 49, by means of which a groove 87 is formed, within which the DC coil 29 is located.

In order to convert the static field into the alternating field that is required for purposes of induction, the invention provides for a rotating mechanical component, specifically the pole wheel 19, as shown in FIG. 5. When the pole wheel 19 rotates past the static (that is to say, fixed) magnetic ring 20, this requirement is fulfilled.

The pole wheel 19 in FIG. 5 preferably consists of a plurality of components, for example three components, for example an inner pole ring 53, an outer pole ring 54 of a ferromagnetic material, preferably pure iron, and a pole ring carrier 55 of, for example, an anti-magnetic material, but preferably one with good electrical conductivity, for example aluminium, copper, or stainless steel. The inner and outer pole rings can consist of solid material, layered sheet steel, or ferrite.

In the assembly of the magnetic ring and the pole wheel, the magnetic ring 20 and the pole wheel 19 are axially adjacent, and an air gap (not shown) that is as small as possible is formed between them.

As determined by the functionality, the static magnetic field 51 across this air gap, which is as small as possible, between the magnetic ring 20 and the pole wheel 19 is converted, by the rotation of the latter, from the pole wheel 19 into an alternating magnetic field 52 on the fixed (stationary) induction ring 18, which is, for example, bolted in position. Here it does not matter whether the pole wheel behaves dynamically or rigidly with respect to the magnetic ring. The static magnetic field 51 is transferred without loss, apart from small air gap losses, and is also maintained as a static field in the pole wheel in the region that is closer to the magnetic ring. The alternating field-side 52 of the pole wheel is subject to the laws of coercivity or remagnetisation losses, the skin effect, or eddy current losses in the case of a solid material.

FIGS. 5a and 5b show two alternative forms of embodiment of an inventive pole wheel 19.

In the first variant, that is to say, in FIG. 5a, a plurality of pole extensions 46 and 47 are arranged on the side of the pole wheel 19 facing towards the induction ring 18, that is to say, on the side of the pole wheel 19 facing away from the magnetic ring 20.

The number of pole extensions is preferably more than ten, preferably more than 12.

In FIG. 5a it can clearly be seen that the inner pole ring 53 of the pole wheel has more than ten pole extensions 46, 47, which extend radially from the inside to the outside.

The outer pole ring 54 of the pole wheel 19 also has more than ten pole extensions, which similarly extend radially from the outside to the inside.

As can clearly be seen in FIG. 5a, the pole extensions 46 of the inner pole ring 53 and the pole extensions 47 of the outer pole ring 54 are arranged offset relative to one another, so that they mesh with one another (that is to say, are located closer together), and thereby overlap in the radial direction, as can be seen in FIG. 5a, thus transforming the static magnetic field of the magnetic ring into an alternating field in the adjacent induction ring 18. This results in a "north and south" pole relationship in the induction ring 18 that is dependent on the direction of rotation, that is to say, per revolution of the pole wheel, and as a function of the number of poles, the polarity is changed correspondingly often. In this manner eddy currents are induced in the pole wheel 19 and in the induction ring 18. In the variant shown in FIG. 5a, the negative torque always predominates over the positive torque.

In FIG. 5a it can also be seen that the pole ring 19 has the pole ring carrier 55 with a bearing stub 21a. The pole ring carrier 55 correspondingly has recesses to receive the pole extensions 46 and 47 of the inner and outer pole rings.

As already stated, the pole ring carrier 55 preferably consists of an anti-magnetic, preferably a good electrically conductive, material, for example, aluminium, copper, or stainless steel. However, an embodiment in plastic would also be conceivable and in accordance with the invention.

FIG. 5b shows an alternative design variant of the pole wheel 19.

The inner pole ring 53 and the outer pole ring 54, with their corresponding pole extensions 46 and 47, are again clearly visible. In this variant, the number of pole extensions is significantly higher than the number (ten) in the variant in FIG. 5a.

As can be seen in FIG. 5b, the individual pole extensions 46, 47 are again oriented radially, with their longitudinal axes in the same alignment, and thus the pole extensions 46 of the inner pole ring 53, and the pole extensions 47 of the outer pole ring 54, are radially spaced apart from each other (at a distance that is predetermined).

Consequently, the length of the pole extensions 46, 47 in the variant shown in FIG. 5b is kept shorter than the length of the individual pole extensions shown in FIG. 5a, and thus the pole extensions 46 and 47 of the inner and outer pole rings do not overlap, but as stated, there is a significantly larger number of poles for the same build size (outer diameter of the pole wheel) as in the variant in FIG. 5a.

The number of pole extensions in the variant shown in FIG. 5b, is well over 20, preferably or more, or a number in the range between 10 and 100, or more.

In the variant of the pole wheel shown in FIG. 5b, no classic alternating magnetic field (alternating north/south field in the induction ring) is generated; instead the magnetic circuit is temporally interrupted (chopped) as a function of the speed of rotation and the number of poles. The constant build-up and breakdown of the magnetic field thus similarly generates eddy currents in the pole wheel 19 and the induction ring 18. In contrast to the variant shown in FIG. 5a, the variant shown in FIG. 5b periodically alternates between a positive and a negative torque, whereby here too the negative torque predominates over the positive torque.

As can also clearly be seen in FIG. 5b, the pole ring carrier 55 is correspondingly fitted with recesses, in which the pole extensions 46 and 47 of the inner and outer pole rings are received precisely, so that the pole rings 53, 54 are held in the pole ring carrier 55. The corresponding mounting 21a is also clearly visible.

By virtue of its internal rigidity, the pole ring carrier 55 has to absorb all the magnetic forces acting on the pole rings 53, 54.

A metal is therefore particularly suitable as the material for the pole ring carrier 55; one that is anti-magnetic, but preferably consists of a material with good electrical conductivity.

There are certain freedoms in the configuring of the cross-section of the pole extensions 46 and 47.

As can clearly be seen in the variants shown in FIGS. 5a and 5b, the pole extensions 46 and 47 are tapered in cross-section, but it would also be conceivable for these to be designed with a rectangular cross-section. It is also possible to design the number of poles, that is to say, the number of pole extensions of the inner pole ring and the outer pole ring, to be asymmetric, that is to say, unequal.

As stated, the pole ring carrier 55 can be made of a non-magnetic material, but can be made of an electrically conductive or an electrically insulating material. Such a material selection is also possible for the pole rings, but these should then be electrically conductive or non-conductive.

This depends on the particular thermal performance potential that is required. With electrically conductive materials and solid components, eddy currents are also induced in the pole wheel as in the induction ring; these considerably increase the heat output.

FIG. 6a shows a first variant of the induction ring 18 in an exploded view. As can be seen, the induction ring 18 in FIG. 6a has a three-part construction, and has a similar form of structure to that of the pole rings.

Here, too, depressions 33a are formed as pockets, which prevent a homogeneous manifestation of the magnetic field. The more homogeneously the magnetic field is manifested in the induction ring, the greater is the tendency towards the braking mode, that is to say, towards a negative torque.

As shown in FIG. 6a, the first part 33 (disc shape) of the induction ring 18 is made of a ferromagnetic material, which can also have electrically conductive properties.

Corresponding to the first part 33 of the induction ring 18, a magnetic, electrical insulator 50 follows axially as a second part, which is adjacent to (but spatially separated from) the first part 33. This insulator 50 is not absolutely necessary, but if it is used, this measure has the consequence that the positive torque components are increased, but the manifestation of eddy currents in the overall system is somewhat reduced.

FIG. 6b shows that it is also possible to design a first part 33 of the induction ring 18 as a homogeneous disc, which, unlike the variant in FIG. 6a, does not have any depressions 33a.

FIG. 6c shows another variant of the induction ring, which is not made of a ferromagnetic material, but of a material with good electrical properties.

It is nonetheless also possible to use a ferromagnetic material for the induction ring 18, even though this may not always be as advantageous.

In FIGS. 6a and 6b it can be seen that another disc 63 (the third part), made of a material with good thermal conductivity, is attached to the side of the induction ring 18 facing away from the pole wheel 19. The thickness of this disc is not subject to any particular specification. The better the thermal conductivity of the disc material, the better is the transfer of heat from the induction ring 18 into the disc 63. A liquid heat transfer medium washes around the disc 63 and ensures an almost loss-free heat transfer in the system. At the same time the disc 63 is the mechanical carrier of the induction ring, and is bolted to the housing 17, and thus statically arranged within the inventive device.

It would also be conceivable for the side facing the heat transfer medium to be profiled in order to increase the convection surface.

The induction ring (FIG. 6) has a similar form of structure to that of the pole rings.

To increase the eddy current intensity, the recesses or pockets (FIG. 6a, Item 33a) in the induction ring 18 are filled with a material with good electrical and thermal conductivity. In addition, as stated, a disc made of the same material is attached to the side facing away from the pole wheel 19. The pockets 33a are defined by the pocket edges 33b (webs) shown in FIG. 6a.

It would also be conceivable to design the induction ring without any filler material. Although this would cause a degradation of the heat output for the same primary energy input, it would not influence the basic functionality per se.

FIG. 7 shows once again a view and a cross-section of the whole device according to the invention, that is to say, the rotary-induction heat generator with all parts of the device in a compact design.

With regard to the functionality of the device of the invention, the following should be noted.

The exploded view in FIG. 8 shows the axial side-by-side arrangement of the magnetic ring 20, the pole wheel 19, and the induction ring 18, for purposes of representing the magnetic flux in the magnetic space. In the inventive rotary-induction heat generator, the magnetic ring 20 with the DC coil 29 and the induction ring 18 are arranged statically, that is to say, in a stationary manner, in the machine body, whereas the pole wheel 19, as a dynamic part, can execute a rotational movement.

Here a static magnetic field zone 51 is formed between the magnetic ring 20 and the pole wheel 19, while an alternating magnetic field zone is formed between the pole wheel 19 and the induction ring 18.

An optimum systemic action of the inventive device is achieved if what are fundamentally contrary features, that is to say, the positive (driving mode) and/or negative (braking mode) torques are in equilibrium in the same time sequence. While this is the optimum, it is not, however, always achievable, since in its systemic behaviour the inventive device tends towards a predominance of negative torque. The systemic action per revolution is determined by the number of pole extensions of the pole wheel and by the number of pockets in the induction ring. Here the edges of the pole extensions 46, 47 of the pole rings 53, 54 are preferably parallel to, or contrary to, the pocket edges 33$b$ in the induction ring 18. The angular position of the respective edges relative to one another determines the difference between the positive and/or negative torque. There is a predominance of positive torque until the magnetic moment between the inner and outer pole faces of the pole rings is neutralised to the pole faces of the induction ring. There is then a predominance of negative torque in the opposite direction. The highest energy efficiency is achieved when both torques are in temporal and kinetic equilibrium. If this equilibrium turns into a temporal and kinetic imbalance in the direction of negative torque, the thermal energy efficiency decreases; in the converse case, the thermal energy efficiency increases.

Ideally, the relationship between positive and/or negative torque should not exceed 1:1.03 in favour of negative torque. This slight braking of the pole wheel means that the full excitation power level can be set by the heat generator, and thus the maximum heat output can be called upon. The greater the difference between the braking and driving of the pole wheel in terms of braking, the poorer is the thermal efficiency of the heat generator.

If the negative torque predominates, the rotational energy from the mass inertia of all rotating components can be used effectively to reduce the continuous braking of the pole wheel until a predominance of positive torque is again achieved.

If the positive torque were to constantly predominate over the negative torque, the pole wheel would steadily accelerate to above the critical speed and the heat generator would be damaged. For this reason the excitation power level must be reduced until the speed is adjusted to the specified level. This results in a heat output level that is equivalent to the difference between the positive and the negative torques. It would also be conceivable to brake the pole wheel, to activate the full excitation power level, and thus return the energy thereby extracted into the system. This is achieved by an additional device in which the heat transfer medium is injected into the air gap between the pole wheel and the induction ring, and thus braking takes place as a result of frictional resistance. The quantity of liquid injected can be adjusted precisely to the requirement by means of an appropriate controller.

The inventive rotary-induction heat generator has at least three heat sources; in each case these are sources from which heat is generated, and can thus be filled. These sources are the magnetic ring, the pole wheel, and also the induction ring. Less heat is generated in the pole wheel than in the magnetic ring, while heat generation in the induction ring can be greater than in the magnetic ring, but for a particular design the heat generation in the magnetic ring can also be greater than the heat generation in the induction ring.

DC coils are ohmic resistors that convert 100% of the electrical energy that is introduced into thermal energy.

In order to transfer the heat efficiently via the heat transfer medium from the heat sources (temperature sources) of the induction ring and pole wheel, the invention provides for a pump, for example. The pump is preferably designed as a G-rotor pump, in which an inner pump wheel is driven directly with an adapter carrier via the axis of the pole wheel.

Standardised and preferably temperature-stable high-temperature oil is the preferred heat transfer medium in the heat circuit heat generator/heat exchanger (FIG. 2, Items 11-13). Any other lubricating liquid would also be conceivable. Oil has the advantage that the lubrication of the mounting and pump does not have to be carried out separately, and no sealing of the oil from the water is required. Moreover, oil has a much higher boiling point than water. The high boiling point of the oil allows high temperatures in the thermal circuit and therefore no overpressure occurs. This advantageously saves on expensive overpressure measures. It would also be conceivable to use a heat transfer medium with a lower boiling point, e.g. water, if the components are designed appropriately, and measures are taken to seal against an overpressure.

The invention also provides for temperature cascades in the heating system. The heat generator forms a cascade 1 with an oil temperature up to a possible 250° C., the heat exchanger and mixing box form a cascade 2 with a water temperature up to a possible 99° C., while the actual heating circuit forms a cascade 3 with a conventional water temperature of 30-60° C. This is based on the fact that no more energy, net of a higher heat radiation energy, has to be expended to generate the overtemperatures than at current normal circulation temperatures of a max. 60° C. The cascade technology also increases the energy efficiency.

The transfer of heat from the high-temperature oil in the first cascade to another medium, for example water, in the second cascade, takes place by way of a conventional heat exchanger and, in particular, an oil-water separator 13 is also provided for this purpose, so that the various thermal media circuits have no material connection with each other, and thus the thermal media cannot mix with each other.

A hood with heat-insulating cladding additionally reduces the thermal radiation from the inventive heating device.

The invention is based on the fact that external electrical and kinetic energy must be constantly supplied. A conventional electric motor 45 preferably serves as the electrical-kinetic energy supply source, but it would also be conceivable to select any other form for the external kinetic energy supply source, e.g. an internal combustion engine. The motor accelerates the pole wheel to a predetermined (efficient) rotational speed; 3000 rpm is preferred. The main task of the motor is to constantly introduce the differential kinetic energy between the braking and driving modes. If the energy tends to predominate towards the braking mode, the motor is active; if the energy tends to predominate towards the driving mode, the motor is inactive.

The motor is preferably liquid-cooled and the cooling circuit of the motor is integrated, for example, into the heating circuit. This means that this lost energy can also be utilised in the heating system.

Direct current is provided as the electromagnetic energy supply source. Both the electric motor and the DC coil preferably use a conventional power supply as a source.

The provenance of the electrical energy source is not a subject of the invention.

However, a regenerative energy source is preferred, for example a wind turbine, a photovoltaic system, or similar.

3000 rpm is a preferred rotational speed, such as ensues from 2-pole electric motors at 50 Hz mains frequency without control measures. In accordance with the invention it would also be conceivable to increase or decrease the speed, e.g. by means of inverter control. As far as rotational speed reduction is concerned, this does not pose an energetics problem, because the remagnetisation losses in the electric motor decrease with a reduction in frequency and thus benefit the system. If the rotational speed is increased, mechanical measures are more advantageous if the speed is increased by means of the frequency conversion of an inverter, remagnetisation losses and excitation current in the electric motor increase. This means a greater consumption of energy than energy utilisation. The invention can therefore provide for a mechanical gearbox, preferably a planetary gearbox. On the input side, the gearbox replaces the drive shaft of the drive, and on the output side, for example, directly drives the pole wheel.

With the increase in rotational speed the invention provides for an increase in the heat output at the same build size. In contrast to electrical machines, where an increase in frequency always leads to an increase in remagnetisation losses and a decrease in energy efficiency, here the eddy current density, and thus also the thermal efficiency, increase.

It would also be conceivable to increase the efficiency of the heat generator by means of self-learning software, and thereby to adjust it constantly. In conventional "heating systems", where fossil or renewable energy sources are burned, the combustion temperature can be influenced only slightly, or not at all. This is also true for heat pumps and solar technology; here too, the energy stored in the carrier medium: air, water, earth, and sun, cannot be influenced by the heat generator itself.

In contrast to systems of known art, here the circumstances behave in accordance with the invention. Here, an increase in energy efficiency is indeed possible with an intervention in the basic mechanical and physical structures. In the case of an electric motor, the primary electrical energy can be effectively influenced by way of rotational speed and load characteristics. The same applies to a heat generator, where there are also opportunities to increase energy efficiency. It is easy to find out from tests at which rotational speed the remagnetisation losses are at a minimum, the greatest magnetic penetration depth is provided, and hence the best manifestation of eddy currents ensues. In the summation of all factors, this results in a further improvement in the energy efficiency.

The thermal efficiency of the inventive rotary-induction heat exciter with a DC exciter is a maximum of 98%, whereby some convection losses are unavoidable.

The invention fulfils the goal of achieving a high energy efficiency COP (coefficient of performance)>10. The high coefficient of performance is based on a magnetic potential (vector potential $intB \times Hdiv$ or $intH \times Bdiv$) from the direct current excitation, characteristic of iron, which is converted into kinetic energy in the system in the form of a magnetic force $F=FE+FB$. In addition, kinetic energy is available from the drive to keep the pole wheel running.

The two together result in a kinetic energy that is net of drive losses.

This kinetic energy is converted into positive and negative torque. This results in a delta (difference), from which the values for the energy (or power level) to be externally introduced are calculated.

In order that the system can be embodied in the best possible manner, the magnetic material, the static magnetic field, and the conversion of a static magnetic field into an alternating magnetic field by means of the mechanical device, play essential roles.

The high magnetic saturation by virtue of a low magnetic field strength results in a narrow hysteresis curve. The narrow hysteresis curve means that the magnetic potential is small. Conversely, the higher the magnetic potential, the higher is the external excitation power (current×voltage) that is to be introduced, and consequently the greater is a reduction in performance.

Likewise, high magnetic potential also causes high hysteresis losses (remagnetisation losses) that are disadvantageous in the system and reduce the manifestation of eddy currents in the induction ring, but advantageously have little effect in the system.

According to Ohm's law, the eddy current density determines the thermal power density.

Here are some examples: With pure iron a coefficient of performance COP>10 can be attained. With transformer sheet steel or cast steel a coefficient of performance of COP=1.5 can be achieved, with alloyed sheet steel a maximum coefficient of performance of COP=1.3 can be achieved.

The intrinsic magnetic value of pure iron compared to conventional magnetic materials:

For pure iron, at 1.6 T (Tesla) approx. 10 A/m is required, for transformer sheet steel and cast steel, at 1.6 Tesla 4,000 A/m is required, for alloyed steel sheet, at 1.6 Tesla 6,000 A/m is required, for cast iron, at 1.2 Tesla 21,000 A/m is required.

The listing clearly shows how much more excitation power is required in each case to achieve a magnetic flux density of 1.6 T (Tesla) with the same number of turns.

Pure iron, as stated, has a very high degree of saturation (2.5 T to 1.7 T in the case of transformer sheet steel), a narrow hysteresis curve and a low magnetic potential.

Pure iron is particularly characterised as an ideal magnetic material by the fact that the magnetic saturation, the permeability and the reminiscence are very high, and the coercive field strength is very low. The high reminiscence causes the magnetic flux density to drop only slightly when the excitation current is switched off. This property can be used to advantage in a pulsed modulated circuit for the excitation current and results in a power saving effect of more than 50% at the power source. The low coercive field strength causes only small remagnetisation losses to occur at high frequency. This enables a small excitation current to be used. There are also other high-frequency magnetic agents that come very close to, or possibly even exceed, pure iron under some circumstances. In the present application, therefore, the term "pure iron" also comprises materials that at a magnetic saturation of >1.5 T have an initial permeability of $\mu A > 6,000$.

The geometries of the pole wheel and the induction ring play an equally important role. These determine the ratio of driving to braking. Because only the delta determines the kinetic energy to be applied, it is important to achieve the smallest possible delta. The level of internal kinetic energy resulting from the magnetic force has no influence on the coefficient of performance, and is also irrelevant in this case. Only the eddy currents determine the thermal energy and not the kinetic energy. By virtue of the vectorial subordination in the geometry (Epot=□-m×B=□-m B cos θ) the eddy currents also determine the potential energy from the magnetic moment.

This means that it is not possible to discern any direct correlation between magnetic moment and torque. This freedom is also desirable, since it determines the level of performance efficiency.

REFERENCE SYMBOLS

1 Rotary-induction heat generator
2 Mixing box
3 Base frame
4 Heat and sound insulation mat
5 Control electronics
6 Rear wall
7 Rear wall heat insulation
9 Display and control element
10 Rotary-induction heat generator unit
11 Upper heat exchanger housing
12 Lower heat exchanger housing
13 Oil-water separator
14 Drive motor (e.g. electric motor)
15 Coupling
16 Controller
17 Housing
18 Induction ring
19 Pole wheel
20 Magnetic ring
21 Support bearing hub
21a Mounting/bearing stub
22 Support bearing
23 Support bearing
24 Oil pump
25 Guide bearing
26 Guide bearing (support bearing)
27 Front cover
28 Magnetic ring housing
29 DC coil
30 Disc
31 Outer pole ring
32 Pole wheel
33 First part (disc) of the induction ring
33a Depressions
33b Pocket edges
38 Depression
44 Short-circuit ring
45 Electric motor
46 Pole extensions
47 Pole extensions
48 Disc
49 Side parts
50 Insulator, second part (disc) of the induction ring
51 Static magnetic field
52 Alternating magnetic field
53 Inner pole ring
54 Outer pole ring
55 Pole ring carrier
63 Third part (disc) of the induction ring
87 Groove
88 DC coil
89 Power terminals
90 Opening

The invention claimed is:

1. A rotary-induction heat generator with direct current excitation for the heating of solid or liquid or gaseous substances, characterised in that the alternating magnetic field required for purposes of induction, that is to say, for the generation of inductive heat, is generated with a DC coil; a static magnetic field is generated, and this static magnetic field is converted by way of a rotating mechanical component into an alternating magnetic field, wherein a DC coil is received by a magnetic ring (20) and is preferably fixedly connected to the latter, wherein the magnetic ring (20) is statically connected to the housing (17) of the rotary-induction heat generator (1), and wherein the static magnetic field (51) generated by the DC coil (29) is converted by way of a rotating mechanical part, specifically a pole wheel (19), into an alternating magnetic field (52), wherein the pole wheel (19) consists of an inner pole ring (53), an outer pole ring (54) and a pole ring carrier (21, 24), by which the static magnetic field (51) is converted into an alternating field (52) in an induction ring (18) axially adjacent to the pole wheel (32), wherein the inner and the outer pole ring have a plurality of radially oriented pole extensions (46, 47), preferably more than ten, which either:
 a) mesh with one another, that is to say, are arranged partly radially next to one another, or overlap with one another (FIG. 5a), or
 b) do not overlap with one another; instead the pole extensions (46) of the inner pole ring (53) are radially spaced apart from the pole extensions (47) of the outer pole ring (54), wherein the pole extensions of the inner and outer pole ring have a predetermined distance (A) from one another and preferably the number of pole extensions of the inner pole ring (53) corresponds approximately to, or is the same as, the number of pole extensions of the outer pole ring (54).

2. The rotary-induction heat generator of claim 1, characterised in that the rotary-induction heat generator thus preferably has an electrical/kinetic efficiency of less than 10%, preferably even less than 2%, and a COP (coefficient of performance) factor of more than 3, preferably a value in the range between 6 and 50.

3. The rotary-induction heat generator of claim 1, characterised in that the induction ring (18) consists of:
 a) a ferromagnetic material, which can also have good electrical properties, or
 b) consists of a material that is electrically conductive, but not ferromagnetic.

4. The rotary-induction heat generator of claim 1, characterised in that the heat is generated in the magnetic ring (20), in the pole wheel (19), as also in the induction ring (18), wherein the heat generated in the pole wheel (19) is less than that in the magnetic ring.

5. The rotary-induction heat generator of claim 1, characterised in that the induction ring (18) consists of a plurality of disks connected to one another.

6. The rotary-induction heat generator of claim 5, characterised in that the induction ring (18) has depressions (pockets) (33a), which are filled with an electrically conductive material, preferably aluminium.

7. The rotary-induction heat generator of claim 5, characterised in that the induction ring has depressions, which are filled with an electrically non-conductive material (insulator).

8. The rotary-induction heat generator of claim 1, characterised in that the magnetic ring (20) has a short-circuit ring (44), and this short-circuit ring (44) preferably consists of a material with a higher value of electrical conductivity, and/or with a higher value of magnetic permeability, than that of the magnetic ring (20).

9. The rotary-induction heat generator with direct current excitation of claim 1, characterised in that the transformation of the static magnetic field into an alternating magnetic field takes place in cascades, wherein the geometric shape, the magnetic permeability (i B/H) and the electrical conductivity (σS/m) of the related components, reduces the magnetic flux density (B Tesla) from the magnetic ring (20) to the pole wheel (19) preferably by 0.7 Tesla, and from the pole wheel (19) to the induction ring (18) preferably by 0.7 Tesla, wherein from the cascade-form reduction of the magnetic field or magnetic potential, high parasitic magnetic fields in the air gap, caused by an alternating field, which results from the rotation of the pole wheel (19), between the magnetic ring (20) and the pole wheel (19), and which is substantially reduced in the air gap between the pole wheel (19) and the induction ring (18), form high eddy currents in the magnetic ring (20), are reduced in the pole wheel (19), and a further reduction ensues in the induction ring.

10. The rotary-induction heat generator of claim 1, characterised in that kinetic energy is required for the transformation of the static magnetic field into an alternating magnetic field by means of a mechanical component, and the total kinetic energy is divided into driving energy and braking energy, wherein the total kinetic energy is preferably converted into electrical energy in the form of eddy currents, and the electrical energy in the eddy currents is preferably converted, completely, or as far as possible, into heat.

11. The rotary-induction heat generator of claim 1, characterised in that the heat is generated primarily in the induction ring component (18), and secondarily in the pole wheel component (19).

12. The rotary-induction heat generator of claim 1, characterised in that the heat is transferred from the induction ring (18) and the pole wheel (19) into liquid or gaseous substances.

13. The rotary-induction heat generator of claim 1, characterised in that the differential kinetic energy for the maintenance of the rotation of the pole wheel (19) is applied by means of an external drive (14), preferably an electric motor.

14. The rotary-induction heat generator of claim 1, characterised in that high-temperature oil is preferably used as the heat transfer medium, and preferably heating up to 250° C. is possible without steam formation.

15. The rotary-induction heat generator of claim 1, characterised in that for heat radiation reasons, a hot/cold water mixing unit, with the circulating pumps and the hot/cold water mixing device, is integrated into the heating system.

16. The rotary-induction heat generator of claim 1, characterised in that the thermal output power is more than 10 kW, preferably more than 20 or 50 kW, or particularly preferably more than 100 to 500 kW.

* * * * *

UNITED STATES PATENT AND TRADEMARK OFFICE
CERTIFICATE OF CORRECTION

| | |
|---|---|
| PATENT NO. | : 11,844,169 B2 |
| APPLICATION NO. | : 17/043472 |
| DATED | : December 12, 2023 |
| INVENTOR(S) | : Andreas Seiwald |

It is certified that error appears in the above-identified patent and that said Letters Patent is hereby corrected as shown below:

On the Title Page

In Item (72) under "Inventor", in Column 1, delete "Bremen (DE)" and insert -- Söll, Austria -- therefor.

Signed and Sealed this
Thirtieth Day of July, 2024

Katherine Kelly Vidal
*Director of the United States Patent and Trademark Office*